US008296252B2

(12) United States Patent
Bernard

(10) Patent No.: US 8,296,252 B2
(45) Date of Patent: Oct. 23, 2012

(54) PROCESS AND APPARATUS FOR EVALUATING OPERATIONAL RISKS FOR AIDING IN VEHICULAR MAINTENANCE DECISIONS

(75) Inventor: Denys Bernard, Faudoas (FR)

(73) Assignee: Airbus Operations SAS, Toulouse (FR)

( * ) Notice: Subject to any disclaimer, the term of this patent is extended or adjusted under 35 U.S.C. 154(b) by 934 days.

(21) Appl. No.: 12/182,625

(22) Filed: Jul. 30, 2008

(65) Prior Publication Data
US 2009/0055339 A1 Feb. 26, 2009

(30) Foreign Application Priority Data

Aug. 20, 2007 (FR) ...................... 07 57098

(51) Int. Cl.
*G06F 17/00* (2006.01)
*G06N 5/02* (2006.01)
(52) U.S. Cl. ...................................... 706/46
(58) Field of Classification Search .................. 706/45, 706/46, 47, 62; 702/33–35, 81–84, 179–185; 701/3–14
See application file for complete search history.

(56) References Cited

U.S. PATENT DOCUMENTS

| 5,210,704 | A | 5/1993 | Husseiny |
| 6,574,537 | B2 * | 6/2003 | Kipersztok et al. ............. 701/29 |
| 6,868,319 | B2 * | 3/2005 | Kipersztok et al. ............. 701/29 |
| 7,209,814 | B2 * | 4/2007 | Kipersztok et al. ............. 701/29 |
| 2002/0184178 | A1 | 12/2002 | Tasooji et al. |
| 2007/0038838 | A1 * | 2/2007 | Greis et al. ..................... 711/207 |

FOREIGN PATENT DOCUMENTS

GB 2 426 090 A 11/2006

* cited by examiner

*Primary Examiner* — Jeffrey A Gaffin
*Assistant Examiner* — Ilya Traktovenko
(74) *Attorney, Agent, or Firm* — Oblon, Spivak, McClelland, Maier & Neustadt, L.L.P.

(57) ABSTRACT

The invention relates to a method and devices for evaluating operational risks in order to aid in the decisions concerning maintenance operations on vehicles during scheduled utilization of the vehicle. Scheduled utilization comprises at least one utilization period. After the degradation of at least one of the components of the vehicle has been analyzed (130), the functional consequences, for the vehicle, of the analyzed degradation are evaluated (125) according to the scheduled utilization of the vehicle. An operational index of the vehicle is then determined (110) for the utilization periods according to the evaluated functional consequences.

15 Claims, 6 Drawing Sheets

PROCESS AND APPARATUS FOR EVALUATING OPERATIONAL RISKS FOR AIDING IN VEHICULAR MAINTENANCE DECISIONS

The present invention relates to a decision aid and more particularly to a method and devices for evaluation of operational risks as an aid in maintenance decisions concerning vehicles such as aircraft.

First level maintenance of aircraft, or in other words the totality of direct interventions (not taking shop repairs into account), consists mainly of corrective actions aimed at replacing or repairing failing components of the aircraft or components in the course of degradation, of scheduled, generally periodic inspections and of preventive actions such as replacement of equipment items having limited useful life.

FIELD

The corrective actions are based in particular on knowledge of the state of the airplane, which is obtained especially from reports by the crews, on-board diagnostic systems and examinations performed during the scheduled inspections.

BACKGROUND

Maintenance activity is commonly organized into "line maintenance" and "hangar maintenance". Hangar maintenance is undertaken during preprogrammed inspections. Such maintenance operations are often conducted at the main base of the company that utilizes the aircraft. Line maintenance is performed between two flights, wherever the aircraft is located. The main purpose of line maintenance is urgent corrective actions, whereas hangar maintenance makes it possible to perform scheduled tasks as well as deferred corrective actions. In general, therefore, non-urgent corrective actions are systematically deferred until the next inspection.

However, the maintenance policies such as presented in the foregoing are not always optimal. By deferring corrective actions until the next inspection, line maintenance increases the risk that additional degradation will cause a flight delay or cancellation, or other disturbances.

SUMMARY

The invention makes it possible to resolve at least one of the problems mentioned in the foregoing.

The object of the invention is therefore a method for aiding in the decision concerning maintenance operations on vehicle components during scheduled utilization of the said vehicle, the said scheduled utilization comprising at least one utilization period, this method being characterized in that it comprises the following steps:
 analysis of the degradation of at least one of the said components;
 evaluation of the functional consequences, for the said vehicle, of the said analyzed degradation according to the said scheduled utilization of the said vehicle; and
 determination of an operational index of the said vehicle for the said at least one period according to the said evaluated functional consequences.

The method according to the invention thus makes it possible to optimize the maintenance operations on a vehicle according to its utilization by determining an operational risk, or in other words a risk of disturbance of normal utilization. The operational risk is based in particular on a prognosis of failure of at least one vehicle component, this prognosis being determined by analysis of degradation of this component.

Advantageously, the method additionally comprises a step of determination of a functional state of at least one of the said components, the said step of determination of an operational index of the said vehicle for the said at least one period being based on the said evaluated functional consequences and on the said functional state, in order to improve the maintenance operations by combining the diagnostic and prognostic functions concerning the vehicle components.

The said step of analysis of the degradation of at least one of the said components preferably comprises a step of estimation of the degradation trend of the said at least one of the said components and of evaluation of a probability of breakdown of the said at least one of the said components.

According to a particular embodiment, the said step of evaluation of the functional consequences, for the said vehicle, of the said analyzed degradation according to the said scheduled utilization of the said vehicle uses a predetermined failure model. For example, the failure model can be determined by theoretical analysis or according to a statistical method based on observation of the behavior of similar components of the same vehicle or of similar vehicles.

The invention also has as an object a device comprising means adapted to implementation of each of the steps of the method described in the foregoing as well as a computer program comprising instructions adapted to implementation of each of the steps of the method described in the foregoing.

The invention also has as an object a device for aiding in the decision concerning maintenance operations for components of a vehicle during scheduled utilization of the said vehicle, the said scheduled utilization comprising at least one utilization period, this device being characterized in that it comprises the following means:
 means for determining a functional state of at least one of the said components;
 means for determining the degradation of at least one of the said components;
 means for analyzing the said determined degradation; and
 means for transmitting the said functional state and the said analysis of the said degradation.

The invention therefore makes it possible to implement at least one part of the means for aiding in the decision for maintenance operations in the vehicle, the other part being capable of being implemented in the vehicle or external thereto. Advantageously, the device according to the invention uses means for determining functional states and degradations present in the vehicle.

Preferably the said means for analyzing the degradation of at least one of the said components comprise means for estimating the degradation trend of the said at least one of the said components and for evaluating a probability of breakdown of the said at least one of the said components.

The invention also has as an object a device for aiding in the decision concerning maintenance operations for components of a vehicle during scheduled utilization of the said vehicle, the said scheduled utilization comprising at least one utilization period, this device being characterized in that it comprises the following means:
 means for receiving a functional state of at least one of the said components and an analysis of degradation of at least one of the said components;
 means for evaluating the functional consequences, for the said vehicle, of the said analyzed degradation according to the said scheduled utilization of the said vehicle; and
 means for determining an operational index of the said vehicle for the said at least one period according to the said evaluated functional consequences and according to the said functional state of the said at least one of the said components.

The invention therefore makes it possible to implement at least one part of the means for aiding in the decision concerning maintenance operations external to the vehicle in order, in particular, to limit the data transfers to and from the vehicle, to benefit from larger calculation and/or storage means and to maintain a single database of failure models.

Advantageously, the said means for evaluating functional consequences comprise means for estimating the degradation trend of the said at least one of the said components and for evaluating a probability of breakdown of the said at least one of the said components.

Other advantages, objectives and characteristics of the present invention will become evident from the following detailed description, written by way of non-limitative example with reference to the attached drawings, wherein:

DESCRIPTION OF THE DRAWING

FIGS. 2a to 2f, illustrates in summary, in graphical form, the role of each of the modules of FIG. 1 for aiding in the decision concerning maintenance operations;

DETAILED DESCRIPTION

The invention makes it possible to combine diagnostic capacities, or in other words detection of anomalies, and prognostic capacities, or in other words prediction of anomalies, in order to evaluate the operational impact of a degradation so as to improve the availability of vehicles such as aircraft. In particular, the invention makes it possible to identify an anomaly whose risk of overall disturbance is significant, in order that line maintenance will be conducted even if the corresponding corrective action is not obligatory according to the regulations.

The maintenance decisions permitting answers to the questions "need to intervene or wait?" and "where and when must repairs be effected?" necessitate estimating the risk of operational impact of the degradations on each scheduled flight.

The risks that must be minimized by the maintenance operations are in particular flight delays and cancellations. This is why it is important to take the scheduled flights of the airplane into account in the formulation of decision-related information items.

The vehicle components can be analyzed as more or less significant contributors to utilization of the vehicle. The modes of breakdown of components are not distinguished, but the modes of failures of functions are. In effect, since the architectures are generally breakdown-tolerant (they often implement redundant elements), loss of one component may have only a minor impact on the function.

The evaluation of functional impacts of degradations of components is based in particular on structural diagrams representing the contribution of the components to each function. The evaluation of the operational risk related to failures of components and to functional impacts of degradations of components can be based on existing data.

Advantageously, a change of frame of reference is effected to determine the operational risks as a function of the real use of the vehicle in order to evaluate the risks according to utilization. For example, with regard to an aircraft, the operational risks can be determined mission by mission, or in other words flight by flight, and not according to usage parameters such as a number of cycles (for example, of takeoff and landing), of operating hours, or calendar period.

Figure 1:
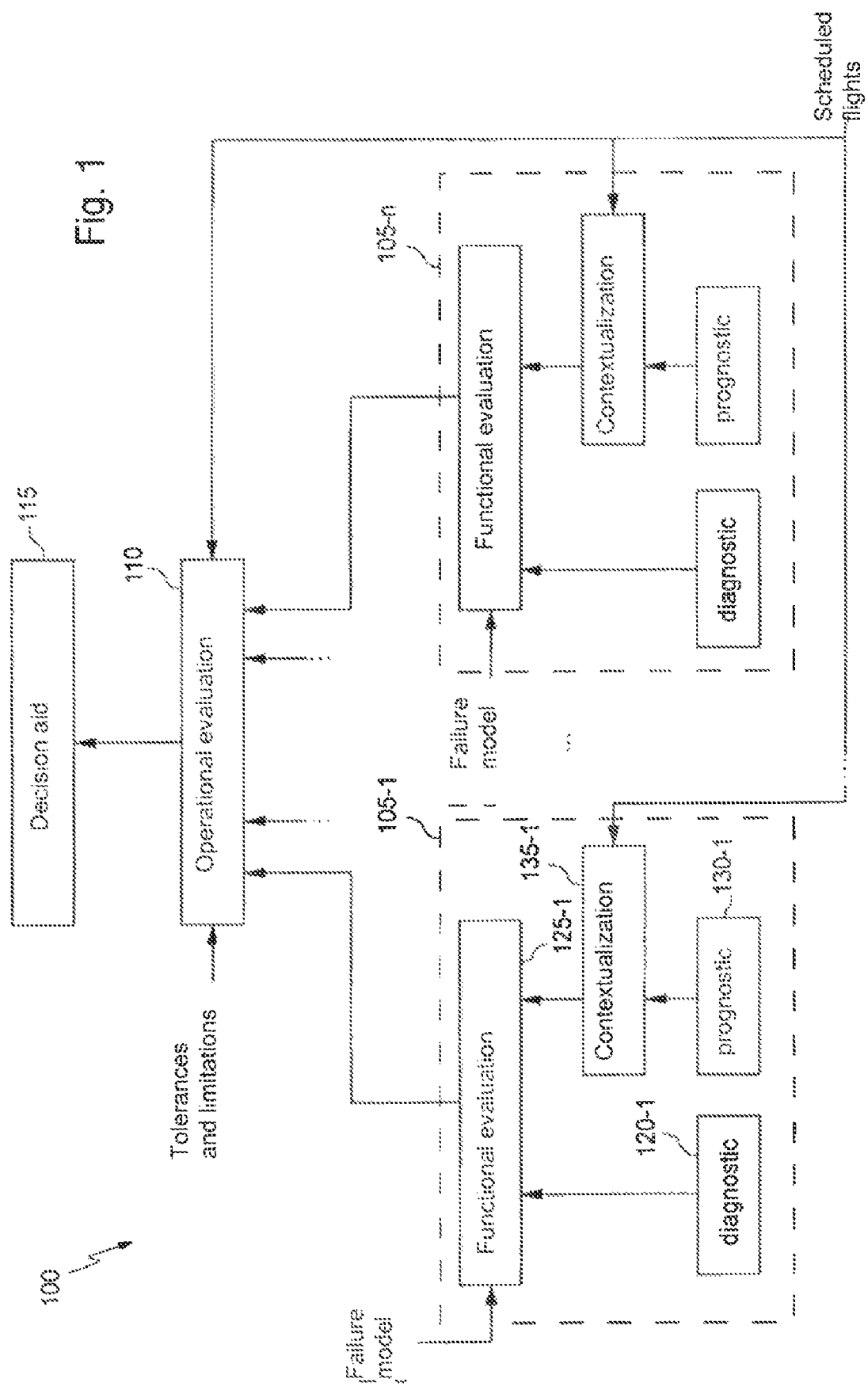
FIG. 1 illustrates an example of architecture adapted to implementation of the invention.

FIG. 1 illustrates an example of architecture 100 adapted to implementation of the invention for aiding in the decision concerning maintenance operations for a vehicle, especially an aircraft. Architecture 100 comprises a plurality of modules referenced 105-1 to 105-n adapted to evaluating the functional risk of a predetermined set of vehicle components. For example, module 105-1 may be adapted to evaluating the functional risk of a governing actuator on the utilization of an aircraft, whereas module 105-n may be adapted to evaluating the functional risk of an automatic pilot calculator on the utilization of the aircraft. The evaluation of the functional risks related to each aircraft component is determined as a function of the scheduled flights and as a function of a failure model specific to each aircraft component.

Modules 105-1 to 105-n adapted to evaluating functional risks are connected to an operational evaluation module 110 whose purpose is to determine the operational capacity of the aircraft as a function of the functional risk related to each aircraft component, of the scheduled flights and of tolerance parameters and limitations.

Operational evaluation module 110 is connected to a decision aid module 115, utilized as the user interface, which in particular makes it possible to present to the user the results obtained by operational evaluation module 110, so as to aid the user in making corrective and preventive maintenance decisions.

Each module adapted to evaluating functional risks, generically referenced 105, itself comprises a plurality of modules. For example, module 105-1 comprises a diagnostic module 120-1 connected to a functional evaluation module 125-1. Module 105-1 also comprises a prognostic module 130-1 connected to a module 135-1 adapted to take into account the context of utilization of the aircraft, in particular the scheduled flights, for estimation of the functional risks. Module 135-1 is referred to as a contextualization module here. Contextualization module 135-1 is in turn connected to functional evaluation module 125-1.

In this case, the architecture of module 105-n is similar to that of module 105-1.

The diagnostic module, generically referenced 120, groups the functions for knowing the breakdowns identified in an aircraft. In this case a breakdown is understood as the abnormal state of a given component of a vehicle. The diagnostic module is provided mainly with the self-diagnostic functions present in certain aircraft components, generally associated with centralized alarm and maintenance functions.

The prognostic module, generically referenced 130, groups the functions for detecting precursor signs of breakdowns, such as wear or degradation data, and the functions for deducing the probability of future breakdown therefrom. The functions for evaluating a future breakdown are advantageously based on the one hand on trend-estimating functions used to evaluate future wear or breakdown. The functions for evaluating a future breakdown are based moreover on models of behavior of the aircraft component with which they are associated. Such models, known to those skilled in the art, are not in themselves directly involved in the invention. They can be determined empirically or by calculation. The breakdown probability is given as a function of usage parameters, or specifically a number of cycles, hours of operation and activations of a particular function of the system.

The object of the contextualization module, generically referenced 135, is to predict in which of the scheduled flights a breakdown can occur. The function of the contextualization module is therefore to determine the risk of breakdown of the component under consideration as a function of each scheduled flight.

The functional analysis module, generically referenced 125, is in charge of calculating the risks of predetermined events per flight. This module uses a specific failure model of the aircraft component with which it is associated to identify the consequences, for the aircraft functions, of each breakdown, whose probability is calculated in modules 130 and 135. Such a model is constructed, for example, from knowledge of the functioning of the aircraft and its components. The determination of such models, known to those skilled in the art, is not directly involved in the scope of the invention.

Operational evaluation module 110 calculates the risks of disturbance of flights resulting from functional impacts of anomalies determined by the functional evaluation modules. The operational impacts can be classified into several categories such as delays or cancellations, mission interruptions, supplementary tasks for the crew and extra operating costs. This module must take into account the accepted tolerances, such as utilization of an aircraft containing a non-operational component, and the limitations resulting from loss of a non-essential function. By way of illustration, the main data that can be used for operational evaluation are obtained from the document containing the list of equipment items necessary for operation of an aircraft, known by the name MEL (acronym for Minimum Equipment List in English terminology). This document, of regulatory nature, specifies the tolerances associated with each breakdown.

The purpose of decision aid module 115 is to present the user with the results of modules described in the foregoing as an aid to deciding on actions to be taken. This module preferably presents the functional and operational impacts of each detected breakdown or degradation. Other derived information items may also be useful, such as classification of detected anomalies by priority, estimation of the operational reliability of the aircraft for all scheduled missions and the operational impact of a possible maintenance decision.

Although the modules adapted to evaluate the functional risks are distinct from one another here, it is advisable to note that FIG. 1 is given by way of illustration and that the presented architecture can be implemented in different forms. In particular, it may be possible to use centralized or partly centralized diagnostic and prognostic modules.

By way of illustration, the behavior of an aircraft component composed of an automatic pilot calculator can be analyzed within the scope of the invention to determine the operational risks resulting from its behavior. If the diagnostic module detects a breakdown of the electrical supply of this calculator, the functional evaluation module indicates that the automatic pilot function is not available. On the basis of this information item, the operational evaluation module concludes, from the MEL list, that the aircraft can be utilized only during the day. Consequently, it will not be possible to operate the aircraft during the next scheduled night flight. It is therefore necessary to repair this component before that flight.

Similarly, a hydraulic fluid filter of an aircraft may be one of the aircraft components analyzed within the scope of the invention. By analyzing differential measurements of the pressure between the inlet and outlet of the filter, the prognostic module associated with the filter can determine the evolution of its fouling as a function of its use, or in other words as a function of the utilization of the aircraft.

By comparing this information item with the scheduled flights, the contextualization module can deduce therefrom the evolution of its fouling as a function of the scheduled flights. The functional evaluation module can then transform this evolution into a risk for operation of the aircraft. This risk is then analyzed by the operational evaluation module, which compares this risk with predetermined tolerances so as to evaluate the time at which it will no longer be possible to utilize the aircraft.

These information items are then transmitted to the decision aid module so as to permit the user to determine when and where this filter will have to be changed.

Figure 2:
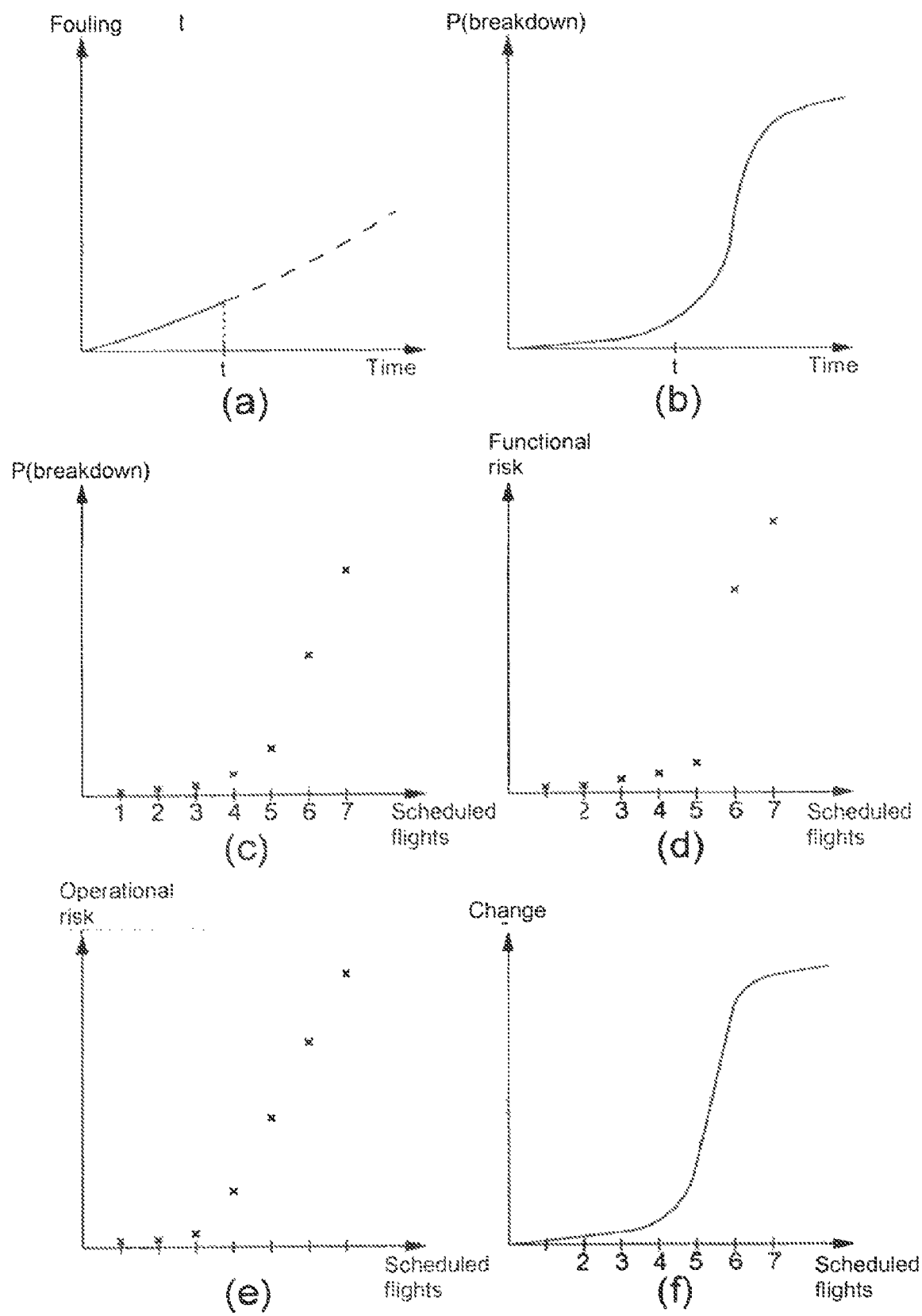
FIG. 2, comprising

FIG. 2, comprising FIGS. 2*a* to 2*f*, illustrates in summary, in graphical form, the role of each of the modules of FIG. 1 for aiding in the decision concerning maintenance operations in the case of the filter presented in the foregoing.

FIG. 2*a* is a graph whose abscissa represents time, for example in hours of use of the filter, and whose ordinate represents the degree of fouling. The solid curve represents the observed evolution of the fouling level or degree of fouling on the basis of measurements made, while the dashed curve represents the extrapolation of this curve permitting, in particular, an estimate of the fouling after the present moment, denoted t. The extrapolation is achieved here by standard mathematical techniques.

FIG. 2*b* corresponds to the probability of failure of the filter, or in other words the probability that the filter is no longer in conformity with the required specifications. The probability of failure of the filter is derived from its fouling and from a model of predetermined behavior. The probability of failure of the filter is determined as a function of the time of use of the filter. FIG. 2*b* illustrates the role of prognostic module 130.

FIG. 2*c* represents a graph similar to that of FIG. 2*b*, in which the probability of failure of the filter is evaluated as a function of the scheduled flights, or in other words the probability of failure of the filter is estimated for each mission. The graph of FIG. 2*c* is determined on the basis of that of FIG. 2*c* and of the duration of the scheduled missions. FIG. 2*c* illustrates the role of contextualization module 135.

FIG. 2*d* illustrates a graph in which the functional risk related to the probability of failure of the filter is expressed as a function of the scheduled flights. This graph is constructed on the basis of the graph represented in FIG. 2*c* and of a failure model. The failure model is determined, for example, by statistical observation of the consequences, for functioning of the aircraft, of the evolution of certain parameters of a set of similar components belonging to the same aircraft or to similar aircraft. Here the failure module associates a functional risk and its probability with each probability of failure of the filter according to the scheduled flights. It is advisable to note that the functional risk is not related solely to the risk of failure of the filter, because several filters can be used in parallel. FIG. 2*d* illustrates the role of functional evaluation module 125.

FIG. 2*e* represents a graph illustrating the operational risk as a function of the scheduled flights according to the functional risk illustrated in the graph of FIG. 2*d*. What differentiates the operational risk from the functional risk is the nature of the event under consideration. As regards a functional risk, the nature of the event under consideration is loss or degradation of function, whereas, as regards an operational risk, the nature of the event under consideration is, for example, a delay, a cancellation, a route modification, particular constraints on the flight, especially altitude, speed and the impossibility of performing an automatic landing or the increase of operational cost. According to a particular embodiment, the operational risk can be represented according to several graphs, each graph being associated with one type of functional risk. In this case the graph of FIG. 2e represents the operational risk of extra operating costs. FIG. 2e illustrates the role of operational evaluation module 110.

Finally, the graph of FIG. 2f represents a graph for aiding in the decision to change the filter. This graph, determined on the basis of that of FIG. 2e by means of a predetermined transfer function, yields a maintenance index. In the graph of FIG. 2f, an index close to zero means that no maintenance operation is useful, whereas an index close to unity means that a maintenance operation is necessary. FIG. 2f illustrates the role of operational evaluation module 115.

Figure 3:
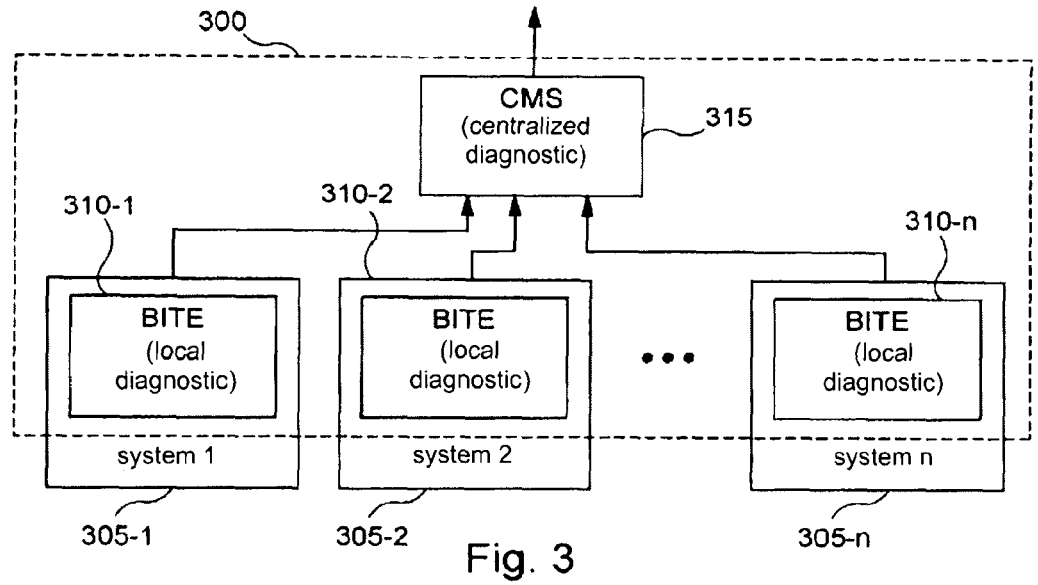
FIG. 3 illustrates an example of implementation of a distributed diagnostic function.

FIG. 3 illustrates an example of implementation of a distributed diagnostic function, or in other words a diagnostic function based on a plurality of modules. The interface of the function is defined unilaterally by the list of services offered to the other modules and/or functions. Each of the services is described in the following manner:

nameService(typeParam1, . . . , typeParamN): typeResult
where typeParam represents the types of input parameters of the service having the name nameService, and typeResult is the type of datum returned by the service.

For example, diagnostic function 300 is assured by the usual self-diagnostic systems implemented in the avionic systems. The architecture of the diagnostic function typically has two levels. The different on-board systems 305-1 to 305-n, in particular the calculators, are provided with diagnostic systems known as BITE (acronym for Built-In Test Equipment in English terminology) 310-1 to 310-n respectively, which perform an imprecise local diagnosis. The overall diagnosis is performed by a central system 315 known as CMS (initials of Central Maintenance System in English terminology), which yields the complete and precise result by correlating the results of the partial diagnoses.

The central diagnostic function offers in particular the following services:
getFaults( ): list_of_LRUs
which furnishes the list of replaceable units, known as LRUs (initials of Line Replaceable Units in English terminology) in breakdown condition at the moment of interrogation of the service; and
getFaultStart(LRU):date Time
which returns the moment of the onset of a particular breakdown among the breakdowns present. In this case the breakdown is specified by the identifier of the LRU in question.

These services rely on the functions of the self-diagnostic devices. They can be considered as an interface via which requests can be made.

Figure 4:
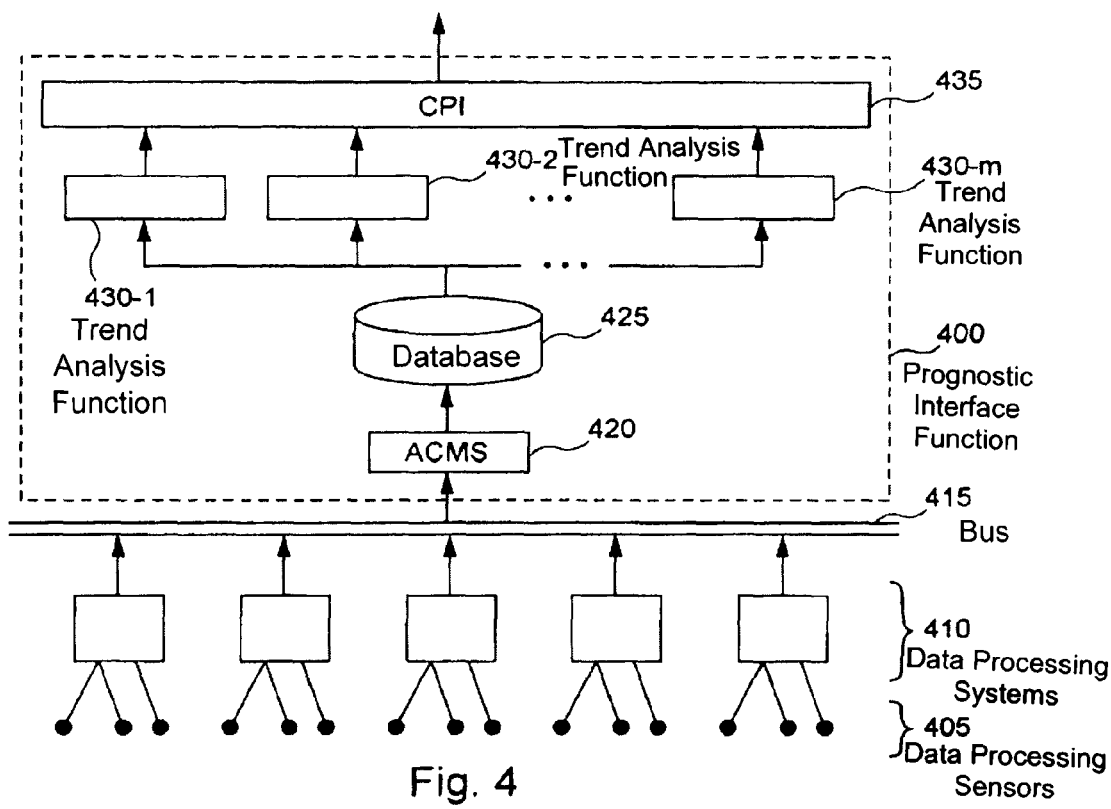
FIG. 4 illustrates an example of implementation of a distributed prognostic function.

FIG. 4 illustrates an example of implementation of a distributed prognostic function, or in other words a prognostic function based on a plurality of modules. As for diagnostic function 300, prognostic interface function 400 is defined unilaterally by the list of services offered to the other modules and/or functions.

In this case the prognosis is made with raw data, not intended for maintenance or prognoses, obtained from data-processing sensors 405 and systems 410 used for implementation of operational functions by the avionic components themselves.

The data are received on board the aircraft by a monitoring system 420 known as ACMS (initials for Aircraft Condition Monitoring System in English terminology). For example, the ACMS is a programmable data collecting and formatting system. It can collect all the data transmitted on buses 415 of the aircraft and format them in reports for use by the data-processing software routines. These data are stored, for example, in a database 425.

Depending on the components being monitored and on their mode of wear, their reliability is evaluated in terms of flights, hours of flight or other units.

Trend-analysis functions 430-1 to 430-m are used to extrapolate the evolution of the collected data. These functions are advantageously implemented in one and the same platform so as to benefit from common data-processing services. These functions also make it possible to convert the evolution of the data into risks of breakdown according to predetermined behavior models.

Functions 430-1 to 430-m are connected to a centralized prognostic interface 435 known as CPI (initials for Centralized Prognostic Interface in English terminology).

The central prognostic function offers in particular the following services:
getDegradations( ): list_of_LRUs
which returns the list of degradations detected at the moment of interrogation, or in other words a list of degraded replaceable components;
getUsageUnit(LRU): usage_unit
which yields the unit used to measure aging of the designated component. The component must be contained in the list of degraded components at the current moment. Usage units are, for example, hours of flight, cycles and hours of functioning, such as hours of functioning of engines and hours of functioning of the APU (initials for Auxiliary Power Unit in English terminology);
getEstimatedReliability(LRU; usage): reliability
which returns the estimated probability of good functioning of the replaceable component in a determined number of usage units; and
getEstimatedRemainingUsefulLife(LRU); number
which returns the remaining useful life in units of measurement of usage.

These services rely on functions of the data-acquisition devices and on mathematical functions that in particular implement trend evaluations and behavior models.

The contextualization module evaluates the probability of breakdown of degraded equipment items for each scheduled flight. Although the probability is calculated by the prognostic module, the contextualization module makes it possible to determine this probability as a function of the scheduled flights. The contextualization module offers in particular the following services:
getEstimatedReliability(LRU, flight): number
which returns the estimated probability that the specified replaceable component will function until the given flight; and
getExpectedOccurrence(LRU): flight
which returns the flight during which the replaceable component has the highest probability of suffering a breakdown.

These services rely on functions of the prognostic module and on utilization data of the aircraft, or in other words on parameters of the scheduled flights, as well as on a conversion function for transforming units such as number of hours or cycles, while identifying the flight according to the parameters of the scheduled flights.

As indicated in the foregoing, the functional evaluation module is in charge of calculating the risks of losses or of degradation of aircraft functions. For that purpose, this module uses failure models making it possible to identify the impacts of each breakdown on the aircraft functions. These models can be determined in particular by knowledge of the functioning of the aircraft and of its systems by means, in particular, of failure trees making it possible to relate the losses of functions breakdowns of components. Unlike breakdown modes, the failure modes cannot be disregarded, because different failures of the same system can have different operational impacts. The functional evaluation module offers in particular the following services:

getForecastedFailures( ): list of failures
which returns the list of predicted or on-going failures;
getFailureOccurrence(failure, flight): probability
which returns the probability that a failure will occur in a given flight; and
getFailureExpectedOccurrence(failure): flight
which returns the identifier of the flight during which the failure will most probably occur.

These services rely on functions of the contextualization module as well as on mathematical functions making possible the implementation of failure modules.

The operational evaluation module calculates the risks of disturbance of flights resulting from functional impacts of anomalies determined by the functional evaluation module. The operational impacts are derived from diverse categories such as delays or cancellations, mission interruptions or supplementary tasks for the crew. This module must take into account the accepted tolerances, such as utilization of an aircraft with a non-operational, non-critical equipment item, and the limitations resulting from the loss of a non-essential function. These tolerances and these limitations are determined, for example, by the MEL, which in particular specifies, for each function, whether or not it is indispensable for the ability to fly, within what time it must be repaired and if there are special operational or maintenance procedures associated with its failure. Such procedures are, for example, deactivation of the system or inspection prior to each flight.

A failure may reduce the operational capacities of the aircraft, for example by preventing automatic landing or requiring that a repair be made within a fixed period, or by imposing particular operational or maintenance procedures. The impacts on execution of the mission may be to prevent the airplane from making the next flight, to cause a delay or to increase the operating costs. The operational evaluation module offers in particular the following service:

getFlightImpacts(failure, flight1, flight2): list of impacts
which returns the impact of the occurrence of a failure, the failure occurring during the flight denoted flight1 and the impact being evaluated for the flight denoted flight2, by applying the hypothesis that the repair is not undertaken between the two flights. The probability of failure on the flight can be obtained by the getFailureOccurrence service of the functional evaluation module.

The decision aid module presents the user with the results of the modules described in the foregoing in such a way as to aid him in deciding on actions to be taken. At least the functional and operational impacts of each detected breakdown or degradation will be presented. Other derived information items may also be useful, such as classification of detected anomalies in order of decreasing priority, estimation of the operational reliability of the airplane for all scheduled missions, and the operational impact of a hypothetical maintenance decision.

These requests are based on cascade-type use of services offered by the different parts of the described system.

Figure 5:
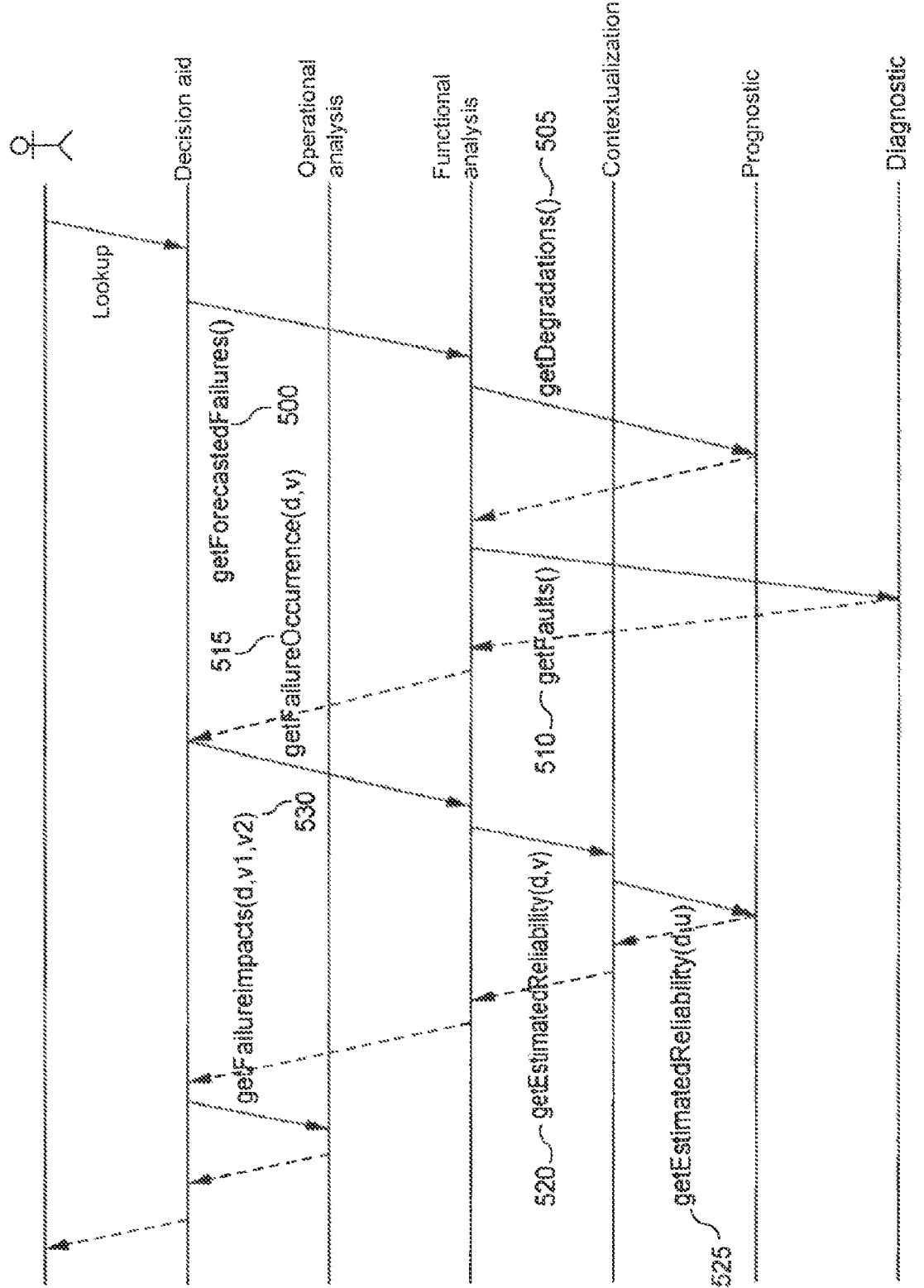
FIG. 5 illustrates cascading calls made when a user requests from the system the probability of being able to effect all the scheduled flights.

FIG. 5 illustrates cascading calls made when a user requests from the system the probability of being able to effect all the scheduled flights.

As represented, the user transmits a request 500 through the decision aid module to obtain the list of predicted or on-going failures. This request, addressed to the functional evaluation module, leads to execution of a request 505 to obtain from the prognostic module the list of detected degradations. Simultaneously or subsequently, a request 510 is executed to obtain the list of components in breakdown condition from the diagnostic module.

A series of requests 515 is then executed to determine the probability that a failure will occur during a given flight. In this case the failures are those that can result from detected degradations. The request is executed for each detected failure, for each detected degradation and for each scheduled flight.

The request to determine the probability that a failure will occur during a determined flight is transmitted by the decision aid module to the functional evaluation module. To execute this request, the functional evaluation module itself transmits a request to the contextualization module to obtain the probability of proper operation of the component during a given flight. The contextualization module in turn transmits a similar request 525 to obtain the probability of proper functioning of the component according to its use. The result is converted according to the scheduled flights.

The decision aid module then transmits a request 530 to the operational evaluation module to determine the impacts, on the scheduled flights, of components in breakdown condition and of detected degradations.

The decision aid system according to the invention can be implemented in different ways. In particular, the system can be implemented in its entirety in the vehicle or partly in the vehicle and partly in one or more fixed stations, such as ground stations.

Figure 6:
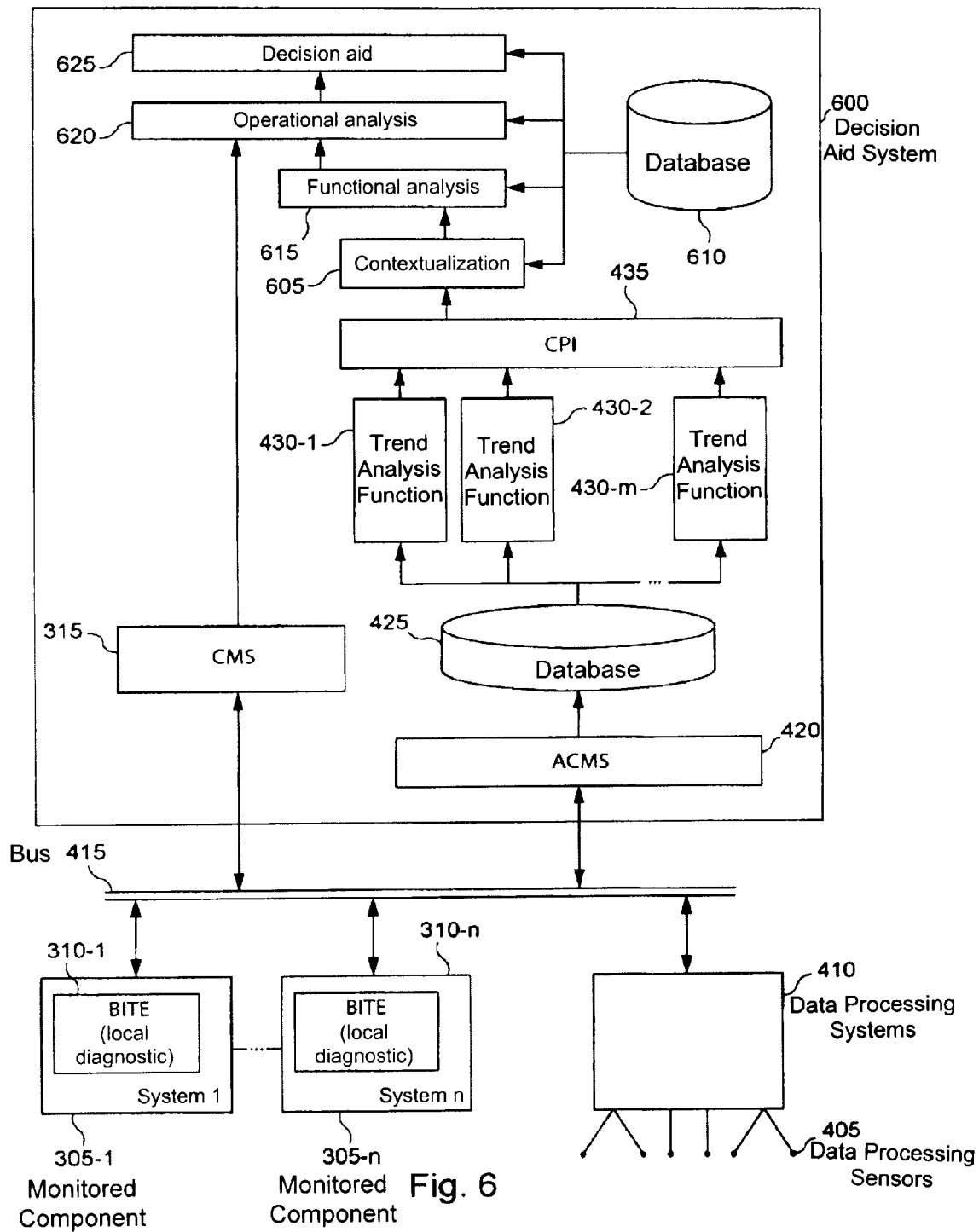
FIG. 6 illustrates a first example of implementation in which the system according to the invention for aiding in the decision is entirely implemented in the vehicle.

FIG. 6 illustrates a first example of implementation, according to which decision aid system 600 is entirely implemented in the vehicle, or in other words decision aid system 600 is autonomous, even though it can be connected at times to one or more fixed stations. In particular, decision aid system 600 can be connected at times to one or more fixed stations so as to access information items such as failure trees and degradation models used for the prognosis, which items can then be stored locally in memory.

As represented, decision aid system 600 is connected to communication bus 415, itself connected in particular to the different monitored components 305-1 to 305-n as well as to sensors 405 and to data-processing systems 410.

Decision aid system 600 comprises a central system 315 CMS, connected to communication bus 415, which yields complete and precise diagnostic results.

Decision aid system 600 also comprises a central system 420 ACMS, connected to communication bus 415, which determines prognostic data. In this case the prognostic data are stored in a database 425 before being used by functions 430-1 to 430-n for trend analysis and for calculation of breakdown probability. The prognostic data comprising the determined breakdown probabilities are transmitted to centralized prognostic interface 435, to be subsequently adapted in contextualization module 605 according to the scheduled flights. In this case the scheduled flights are stored in a database 610.

Alternatively, the information items concerning the scheduled flights can be accessed via a local or remote network.

Database 610 is also used here to store the failure models as well as the tolerances and limitations.

The prognostic data relating to the scheduled flights are then transmitted to functional evaluation module 615 in order to determine the consequences of the observed degradations.

The respective data obtained from diagnostic and functional evaluation modules 315 and 615 are then transmitted to operational evaluation module 620, which in turn transmits the data necessary for the decision to decision aid module 625.

Figure 7:
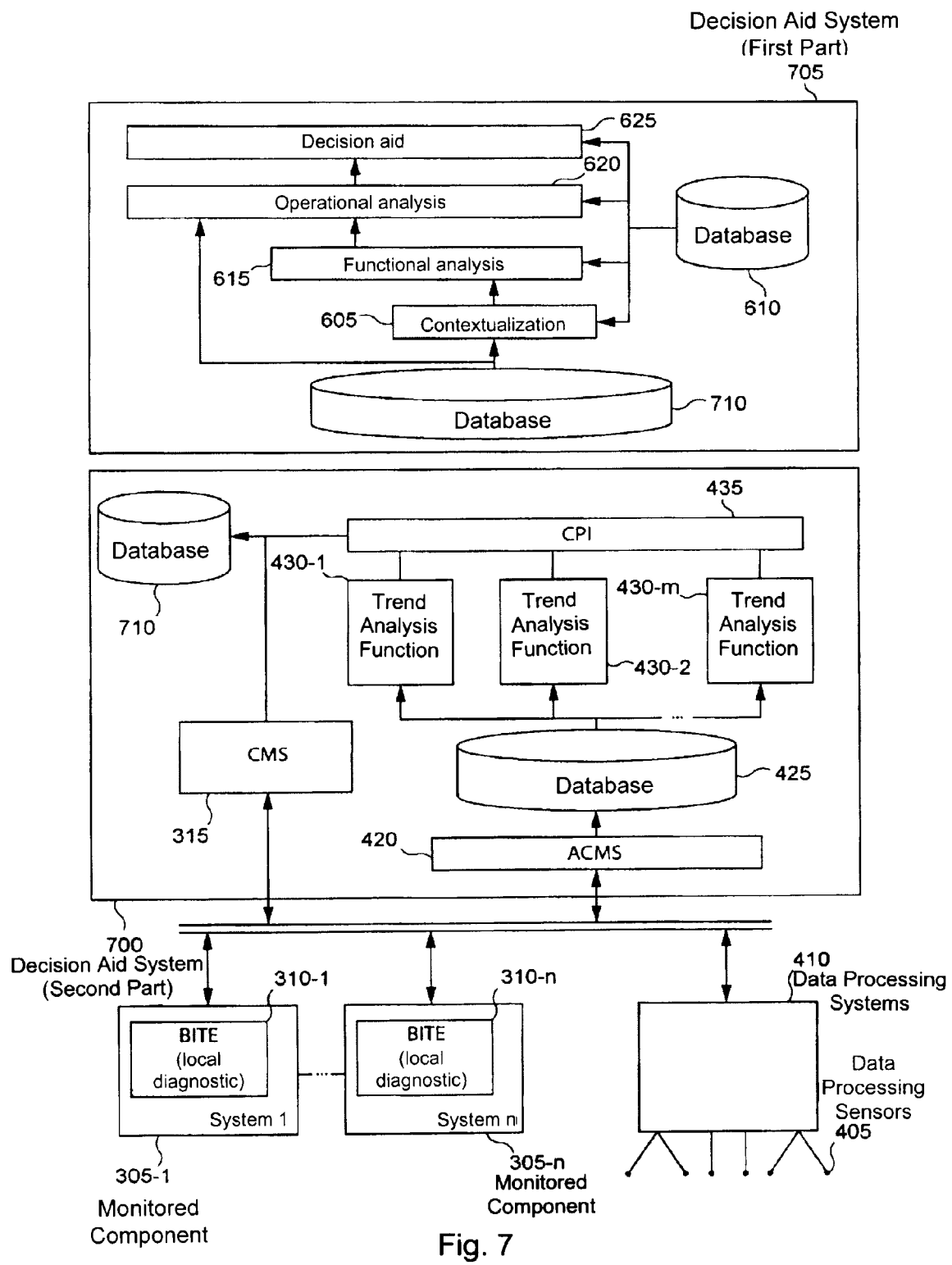
FIG. 7 illustrates a second example of implementation in which the system according to the invention for aiding in the decision comprises a first part implemented in the vehicle and a second part implemented in one or more fixed stations.

FIG. 7 illustrates a second example of implementation, according to which the decision aid system comprises a first part 700 implemented in the vehicle and a second part 705 implemented in one or more fixed stations.

According to this embodiment, a first part of the method is effected locally in the vehicle while another part is effected in one or more fixed stations.

For reasons of cost and availability of means of communication between the vehicle and the fixed stations, it may prove necessary to store diagnostic and prognostic results in the fixed stations, in particular to ensure that the analysis functions do not make numerous calls to the services of the diagnostic and prognostic modules installed on board the vehicles.

To this end, a database 710 is used to store the data obtained from diagnostic module 315 and from centralized prognostic interface 435.

When the vehicle is close to fixed stations implementing the other part of the decision aid method, the data stored in database 710 are transferred to these fixed stations. This transfer can be effected in particular by hard-wired or wireless network, or by physical delivery of a memory medium containing these data, such as a memory card, a hard disk or a disk of DVD type.

This second embodiment therefore makes it possible to limit data processing in the vehicle and to centralize the flight data, the failure models and the tolerances and limitations in one or more fixed stations, or in other words to minimize data updates in the airplane and to correspond more closely to the organization of utilization of the vehicles, especially of the airline companies, for which the maintenance decisions are made on the ground, in a maintenance control center known as MCC (initials for Maintenance Control Center in English terminology). The MCC decides on maintenance actions to be taken and transmits its orders to the maintenance crews working on the airplane.

It is possible to shift other elements of part 700 to part 705 and vice versa. In particular, the centralized prognostic interface and at least part of at least certain trend-analysis functions can be implemented in the fixed stations, in such a way as to capitalize on the trend-analysis experience according to a history of several vehicles and/or to use greater calculating power, making it possible to refine the estimation of trends and the estimation of breakdown probabilities.

Furthermore, the operational evaluation module can integrate functions that take into account utilization costs, so as to optimize the maintenance operations.

Naturally, a person competent in the field of the invention will be able to apply modifications to the foregoing description in order to satisfy specific needs.

The invention claimed is:

1. A method for aiding in a decision concerning maintenance operations on components of a vehicle during utilization of the vehicle, the utilization including at least one utilization period, the method comprising:

analyzing degradation of at least one of the components;
calculating a probability of breakdown of the at least one of the components in each of a plurality of future scheduled trips of the vehicle;
determining, based on the calculated probabilities, a particular future scheduled trip of the vehicle, out of the plurality of future scheduled trips of the vehicle, in which the breakdown of the at least one of the components has a highest probability of occurring;
evaluating functional consequences, for the vehicle, of the analyzed degradation and the determined future scheduled trip of the vehicle according to the utilization of the vehicle; and
determining an operational index of the vehicle for the at least one utilization period according to the evaluated functional consequences.

2. The method according to claim 1, further comprising:
determining a functional state of the at least one of the components, the step of determining the operational index of the vehicle for the at least one utilization period being based on the evaluated functional consequences and on the functional state.

3. The method according to claim 1, wherein the step of analyzing the degradation of the at least one of the components includes a step of estimating the degradation trend of the at least one of the components.

4. The method according to claim 1, wherein the step of evaluating the functional consequences, for the vehicle, of the analyzed degradation and the determined future scheduled trip of the vehicle according to the utilization of the vehicle uses a predetermined failure model.

5. A device for aiding in a decision concerning maintenance operations on components of a vehicle during utilization of the vehicle, the utilization including at least one utilization period, the device comprising:

an analyzing unit configured to analyze degradation of at least one of the components;
a scheduled trip determining unit configured to calculate a probability of breakdown of the at least one of the components in each of a plurality of future scheduled trips of the vehicle, and to determine, based on the calculated probabilities, a particular future scheduled trip of the vehicle, out of the plurality of future scheduled trips of the vehicle, in which the breakdown of the at least one of the components has a highest probability of occurring;
an evaluating unit configured to evaluate functional consequences, for the vehicle, of the analyzed degradation and the determined future scheduled trip of the vehicle according to the utilization of the vehicle; and
a determining unit configured to determine an operational index of the vehicle for the at least one utilization period according to the evaluated functional consequences.

6. A non-transitory computer-readable storage medium including computer executable instructions, wherein the instructions, when executed by a computer, cause the computer to perform a method for aiding in a decision concerning maintenance operations on components of a vehicle during utilization of the vehicle, the utilization including at least one utilization period, the method comprising:

analyzing degradation of at least one of the components;
calculating a probability of breakdown of the at least one of the components in each of a plurality of future scheduled trips of the vehicle;
determining, based on the calculated probabilities, a particular future scheduled trip of the vehicle, out of the plurality of future scheduled trips of the vehicle, in which the breakdown of the at least one of the components has a highest probability of occurring;

evaluating functional consequences, for the vehicle, of the analyzed degradation and the determined future scheduled trip of the vehicle according to the utilization of the vehicle; and determining an operational index of the vehicle for the at least one utilization period according to the evaluated functional consequences.

7. A device for aiding in a decision concerning maintenance operations for components of a vehicle during utilization of the vehicle, the utilization including at least one utilization period, the device comprising:

means for determining a functional state of at least one of the components;

means for determining degradation of the at least one of the components;

means for analyzing the determined degradation;

means for calculating a probability of breakdown of the at least one of the components in each of a plurality of future scheduled trips of the vehicle;

means for determining, based on the calculated probabilities, a particular future scheduled trip of the vehicle, out of the plurality of future scheduled trips of the vehicle, in which the breakdown of the at least one of the components has a highest probability of occurring; and means for transmitting the functional state, the analysis of the degradation, and the determined future scheduled trip of the vehicle.

8. The device according to claim 7, wherein the means for analyzing the degradation of the at least one of the components includes means for estimating the degradation trend of the at least one of the components.

9. A device for aiding in a decision concerning maintenance operations for components of a vehicle during utilization of the vehicle, the utilization including at least one utilization period, the device comprising:

means for receiving a functional state of at least one of the components and an analysis of degradation of the at least one of the components;

means for calculating a probability of breakdown of the at least one of the components in each of a plurality of future scheduled trips of the vehicle;

means for determining, based on the calculated probabilities, a particular future scheduled trip of the vehicle, out of the plurality of future scheduled trips of the vehicle, in which the breakdown of the at least one of the components has a highest probability of occurring;

means for evaluating functional consequences, for the vehicle, of the analyzed degradation and the determined future scheduled trip of the vehicle according to the utilization of the vehicle; and means for determining an operational index of the vehicle for the at least one utilization period according to the evaluated functional consequences and according to the functional state of the at least one of the components.

10. The device according to claim 9, wherein the means for evaluating functional consequences includes means for estimating the degradation trend of the at least one of the components.

11. The method according to claim 1, wherein
the vehicle is an aircraft,
the functional consequences correspond to degradation of a function of the at least one of the components, and
the operational index corresponds to one of a delay of a flight of the aircraft, a cancellation of the flight of the aircraft, a route modification of the flight of the aircraft, and a constraint on the flight of the aircraft.

12. The method according to claim 1, wherein
the vehicle is an aircraft, and
the future scheduled trip of the vehicle corresponds to a future scheduled flight of the aircraft.

13. The method according to claim 1, further comprising:
producing a graphical representation of the calculated probabilities of the at least one of the components in each of the plurality of future scheduled trips of the vehicle, the graphical representation including each of the plurality of future scheduled trips of the vehicle associated with a respective calculated probability.

14. The method according to claim 1, wherein
the calculating of the probability of breakdown of the at least one of the components in each of the plurality of future scheduled trips of the vehicle is based on a duration of each of the plurality of future scheduled trips.

15. The method according to claim 1, wherein
the step of calculating includes a step of accessing information on the plurality of future scheduled trips that is stored in a database.

* * * * *